United States Patent [19]

Barger

[11] Patent Number: 4,820,042
[45] Date of Patent: Apr. 11, 1989

[54] OPTICAL CAVITY SYSTEMS

[75] Inventor: Richard L. Barger, Rollinsville, Colo.

[73] Assignee: Newport Corporation, Fountain Valley, Calif.

[21] Appl. No.: 108,750

[22] Filed: Oct. 15, 1987

[51] Int. Cl.[4] ............................................. G01B 11/26
[52] U.S. Cl. ..................................... 356/153; 356/352
[58] Field of Search ...................... 356/138, 153, 352; 372/34, 38

[56] References Cited

U.S. PATENT DOCUMENTS

| 3,734,627 | 5/1973 | Edwards | 356/153 |
| 4,142,798 | 3/1979 | Barbee, Jr. | 356/138 |
| 4,298,281 | 11/1981 | Schare | 356/153 |
| 4,387,462 | 6/1983 | Markus | 372/34 |

OTHER PUBLICATIONS

C. Fabre et al., Ultrahigh-Finesse Optical Cavities, Optics Letters, 11 (Jun. 1986), 365–367.
The Newport Catalog No. 100, (1987), D-18 and 19.

Primary Examiner—F. L. Evans
Attorney, Agent, or Firm—Benoit Law Corporation

[57] ABSTRACT

Method and apparatus for mode coupling a light beam into an optical cavity having a cavity axis, effect reflection of light of that beam with a mirror along a geometric ray originating laterally of the cavity axis. The mirror is rigidly interconnected with the cavity and is adjusted until the geometric ray coincides with the light beam. That geometric ray is retained in space while moving the optical cavity so that the cavity axis moves translatorily relative to the retained geometric ray, until the cavity axis coincides with the retained geometric ray and thereby with the light beam. Where an optical cavity is located in an oven, first temperature variations of a wall of that oven and second temperature variations of the cavity are sensed, and energization of the oven is controlled more rapidly in response to these first temperature variations, than in response to those second temperature variations.

18 Claims, 2 Drawing Sheets

OPTICAL CAVITY SYSTEMS

BACKGROUND OF THE INVENTION

The subject invention relates to optical cavity systems, including Fabry-Perot optical cavities, optical spectrum analyzers, and optical filters, and to methods and apparatus for operating same and to combinations including such optical cavities.

Optical spectrum analyzers and optical cavities and cavity systems of the type just broadly mentioned are well known as such. Ultrahigh-finesse optical cavities have been described by C. Fabre, R. G. DeVoe, and R. G. Brewer in an article of that name published June 1986 in Vol. 11 of OPTICS LETTERS, mentioning laser-frequency division and stabilization techniques of ultrahigh precision and also gravity-wave detection experiments.

SUMMARY OF THE INVENTION

It is a general object of this invention to increase the finesse of optical cavities.

It is a related object of this invention to increase throughput efficiency of optical cavities.

It is a germane object of this invention to provide improved methods for making optical cavities and cavity systems.

It is a related object of this invention to provide improved methods for operating optical cavities and cavity systems.

It also an object of this invention to provide improved optical spectrum analyzers, laser-frequency dividers and stabilizers, optical filters and the like.

It is a related object of this invention to provide optimum coupling of the incident beam into a single cavity mode.

It is also an object of this invention to protect performance of cavity operation from outside influences.

It is a related object of this invention to provide an improved temperature control for optical cavity systems.

Other objects of the invention will become apparent in the further course of this disclosure.

From a first aspect thereof, the invention resides in a method of mode coupling a light beam into an optical cavity having a cavity axis, comprising, in combination, the steps of positioning a mirror at right angles to, but laterally of, that cavity axis, providing a rigid interconnection of mirror and cavity, effecting a reflection of light of the beam with the mirror along a geometric ray originating at that mirror, adjusting the rigidly interconnected mirror until the latter ray coincides with the beam, and retaining that geometric ray in place while moving the mirror and optical cavity so that the cavity axis moves translatorily relative to the retained geometric ray, until the cavity axis coincides with the retained geometric ray and thereby with the light beam.

From a related aspect thereof, the invention resides in a method of mode coupling a light beam into an optical cavity having a cavity axis, comprising, in combination, the steps of positioning a plane mirror at right angles to, not laterally of, that cavity axis, providing a rigid interconnection of the plane mirror and cavity, effecting reflection of light of the beam with the plane mirror, adjusting the rigidly interconnected plane mirror until that plane mirror extends at right angles to the beam, and moving the optical cavity translatorily, while retaining the rigid interconnection and while moving the plane mirror in a plane extending at right angles, until the cavity axis coincides with the light beam.

From a further aspect thereof, the invention resides in a method of operating an optical cavity, and more specifically, resides in the improvement comprising, in combination, the steps of providing an oven for the cavity having an oven wall, installing the optical cavity inside of the oven, with the oven wall being spaced from the cavity, heating the inside of the oven and the optical cavity with the oven, coupling a light beam into the cavity and performing a function on light from the beam with the heated optical cavity, sensing first temperature variations of the oven wall spaced from the cavity, sensing second temperature variations of the cavity at a location spaced from the oven wall, and protecting performance of the above mentioned function on light from the beam against outside temperature variations by controlling energization of means heating the oven more rapidly in response to the first temperature variations than in response to the second temperature variations.

From another aspect thereof, the invention resides in a combination of an optical cavity having a cavity axis, and means for mode coupling a light beam into that optical cavity, including means for effecting reflection of light of the beam along a geometric ray originating laterally of the cavity axis, including a mirror positioned at right angles to, but laterally of, the cavity axis, and a rigid interconnection of mirror and cavity, means for repositioning the rigidly interconnected mirror until the geometric ray, originating at the mirror, coincides with the beam, and means for retaining the geometric ray in place and for moving the mirror and optical cavity so that the cavity axis moves translatorily relative to the retained geometric ray, until the cavity axis coincides with the retained geometric ray and thereby with the light beam.

From a related aspect thereof, the invention resides in a combination of an optical cavity having a cavity axis, and means for mode coupling a light beam into that optical cavity, including means for effecting reflection of light of the beam, including a plane mirror positioned at right angles to, but laterally of, the cavity axis, a rigid interconnection of the plane mirror and cavity, means for adjusting the rigidly interconnected plane mirror until that plane mirror extends at right angles to the beam, and means for moving the optical cavity translatorily, while retaining the rigid interconnection and while moving the plane mirror in a plane extending at right angles, until the cavity axis coincides with the light beam.

From another aspect thereof, the invention resides in a combination of an optical cavity, an oven for that cavity having an oven wall, means for installing the optical cavity inside of the oven so that the oven wall is spaced from the cavity, means for heating the inside of the oven and the optical cavity with the oven, means for sensing first temperature variations of the oven wall spaced from the cavity, means for sensing second temperature variations of the cavity at a location spaced from the oven wall, and means connected to the means for sensing first temperature variations and to the means for sensing second temperature variations, and connected also to the heating means for controlling energization of the heating means more rapidly in response to the first temperature variations than in response to the second temperature variations.

Aspects of the invention concerning mode coupling and heater or temperature control may be combined within the scope of the subject invention.

Also, other aspects of the invention will become apparent in the further course of this disclosure, and no restriction to any aspect is intended by this Summary of the Invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
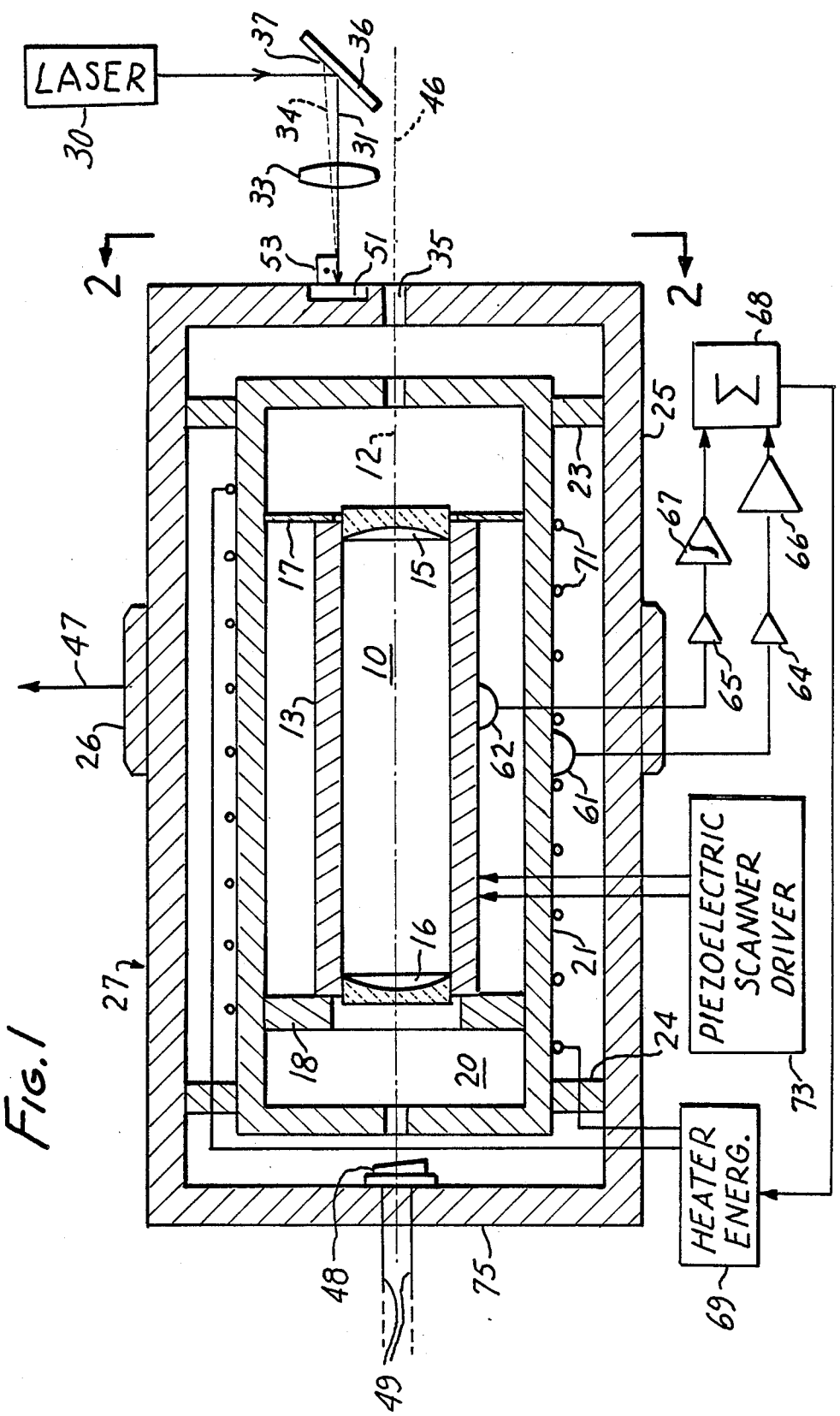
FIG. 1 is a section through an optical cavity system according to a preferred embodiment of the subject invention, as well as a block diagram of a mode coupling system and of a temperature control, also in accordance with embodiments of the subject invention.

The optical cavity 10 shown in FIG. 1 has a longitudinal cavity axis 12 and an expansible and contractible cavity spacer 13 encompassing the cavity axis, such as in the form of a hollow cylinder. The spacer 13 may be viewed as an electromechanical transducer which converts imposed electric oscillations into alternating elongations and contractions of the optical cavity notably in the direction of the longitudinal axis 12.

The hollow-cylindrical cavity spacer 13 may be made of a piezoelectric ceramic composition. Well-known piezoelectric ceramics include the type of lead titanate-zirconate ceramic previously used as optical cavity envelopes and commonly referred to by the abbreviation PZT. The spacer 13 may be non-scanning or fixed; that is, any device may be employed for holding mirrors in a fixed relationship.

The cavity 10 includes a pair of mirrors 15 and 16. Mounting devices 17 and 18 are also shown as representative of any devices for mounting the mirrors 15 and 16 and their spacer 13.

The illustrated preferred embodiment of the invention provides an oven 20 for the cavity 10, having an oven wall 21. The optical cavity, including the expansible and contractible or other spacer 13, is installed inside of the oven, with the oven wall 21 being spaced from the spacer 13, such as by the mounting devices 17 and 18. Mounting devices 23 and 24 space the oven 20 and oven wall 21 from the housing 25.

Mounting of the temperature-controlled optical cavity assembly 27 may be facilitated by the provision of an optional mounting ring 26.

Figure 2:
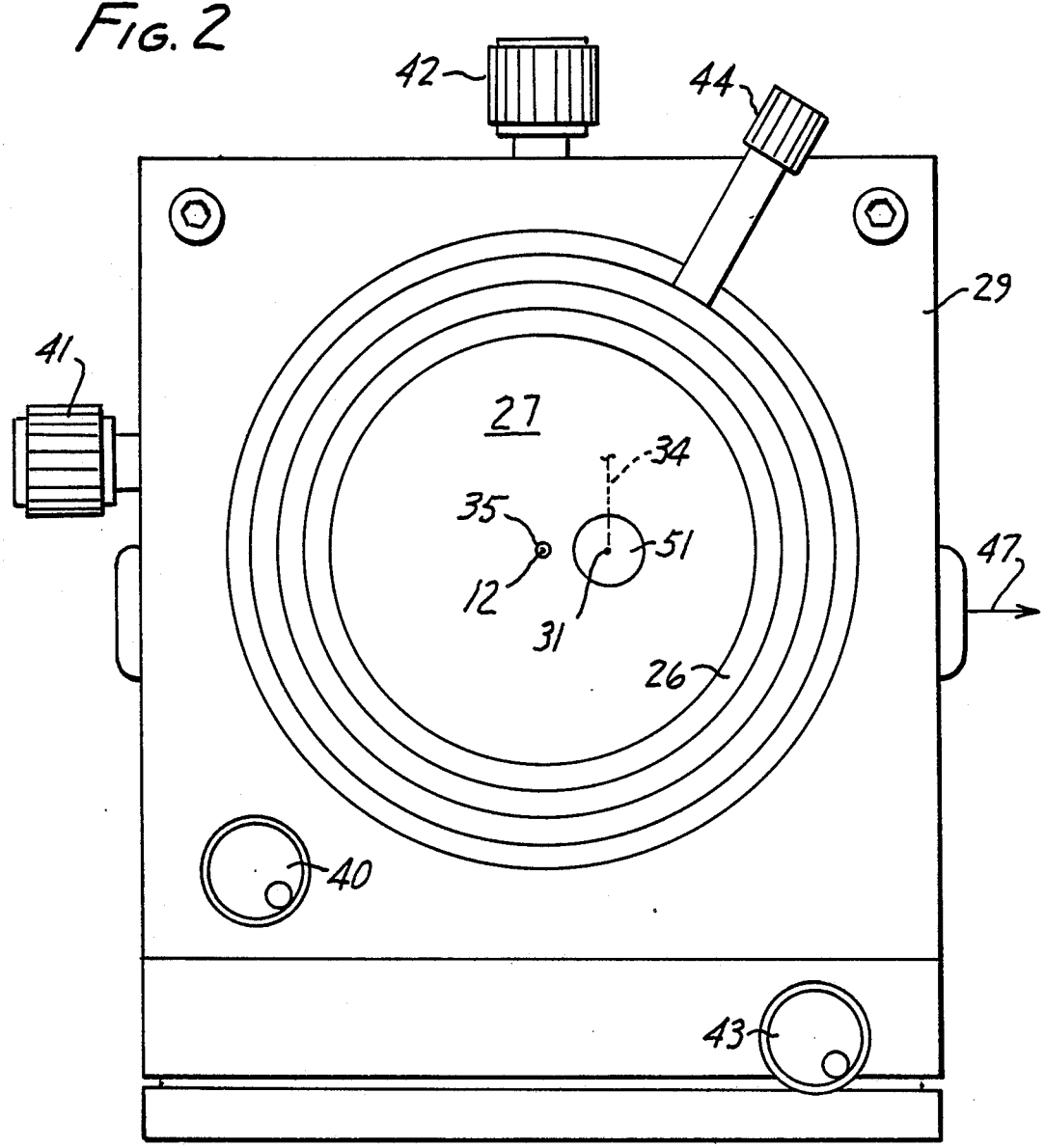
FIG. 2 is a front elevation of a five-axis gimbal optic mount in combination with the optical cavity system shown in FIG. 1 and as seen in the direction of the arrows 2—2 in that figure.

The temperature-controlled optical cavity assembly 27 may be mounted in this or any other suitable manner in a gimbal mount 29 shown in FIG. 2. For instance, the five-axis gimbal optic mount Model LP-1B by Newport Corporation may be employed for that purpose. That and other suitable mounts are shown in the Newport Catalog No. 100 (1987) pp. D-18 and 19.

One aspect of the invention concerns mode coupling of a light beam 31 into the cavity 10. This beam 31 may be a laser beam provided by a laser 30 via conventional parts and components (not shown).

To obtain high efficiency and finesse, it is necessary to couple the incident beam 31 into a single cavity mode. A lens 33 having a predetermined focal length is used for that purpose, so that the lens focal waist is located within the cavity 10 in relationship to the mode diameter.

The illustrated preferred embodiment of the invention effects reflection of light of the beam 31 along a ray 34 originating laterally of the cavity axis 12 or input aperture 35. Typically, the ray 34 will not initially coincide with the incident beam 31.

Such non-coincidence may be detected by several methods. For instance, if a surface mirror 36 is employed for projecting the laser beam 31 eventually into the cavity 10, then a light spot 37 will appear on such mirror apart from a light spot caused by the incident light beam, as long as there is any lack of coincidence of the ray 34 with the light beam 31. Another method would be to project the laser beam 31 straightforwardly through an aperture in a screen, and to watch for a light spot laterally of that aperture, caused by a lack of the desired coincidence. Reflection of incident light may then be adjusted until the ray 34 coincides with the beam 31.

In practice, this can be done by repositioning the optical cavity 10 or cavity assembly 27, such as by actuating any one or more of the five adjustments 40, 41, 42, 43 and 44 of the five-axis gimbal optic mount 29, until the spot 37 becomes coincident with the incidence of the light beam 31 on the mirror 36, whereby the light spot 37 in effect vanishes to visual perception as a separate entity.

At that point, the cavity axis 12 is exactly parallel to the reflected ray 34. For present purposes and in general, that ray 34 may now be considered as a geometric ray.

The geometric ray 34 is retained in place while moving the optical cavity 10 so that the cavity axis 12 moves translatorily relative to the retained geometric ray, until that cavity axis coincides with that retained geometric ray 34 and thereby with the light beam 31. In FIG. 1, such coincidence of the laser beam 31 with the cavity axis 12 for optimum mode coupling is indicated by a dotted line 46, while an arrow 47 in FIGS. 1 and 2 indicates the direction of translatory movement effected, such as with the transverse adjustment 41, for bringing such coincidence about.

According to the illustrated preferred embodiment of the invention, an alignment mirror 51 is positioned laterally of the cavity axis 12 or input aperture 35. That aspect of the invention also provides a rigid interconnection of the mirror 51 and cavity 10 or mirror 51 and mirror mount 17. This may be accomplished by integrating the alignment mirror 57 in a housing of the optical cavity. By way of example, the alignment mirror 51 is made integral with the housing 25, which is part of the overall assembly 27.

The desired reflection of light is then effected with the mirror 51 along the geometric ray 34 then originating at that mirror. The rigidly interconnected mirror 51 may then be adjusted by as many controls as necessary of the optic mount 29, until the latter ray 34 coincides with the incident beam 31. The optic mount 29 is again employed to retain that geometric ray 34 in place while moving the mirror 51 and optical cavity 10 so that the cavity axis 12 moves translatorily relative to the retained geometric ray, as indicated by the arrow 47, until the cavity axis coincides with the retained geometric ray and thereby with the light beam 31.

If the mirror 51 is a plane mirror as seen in FIG. 1, then the following mode coupling technique may be employed.

In particular, the plane mirror 51 is again positioned laterally of the cavity axis 12. A rigid interconnection of that plane mirror and cavity is again established, as mentioned above. Reflection of light of the beam 31 is then effected with the plane mirror 51, and such rigidly interconnected plane mirror is adjusted, such as by repositioning the optical cavity 10 or assembly 27, until that plane mirror extends at right angles to the beam, as indicated at 53 in FIG. 1. The controls of the five-axis gimbal optical mount 29 may be adjusted until the plane mirror 51 extends at right angles to the beam 31.

The optical cavity 10 is then moved translatorily, such as in the direction of the arrow 47, while the rigid interconnection between cavity and mirror is retained and while such plane mirror 51 is moved in a plane extending at the above mentioned right angles, one of which is seen at 53, until the cavity axis 12 coincides with the incident light beam 31. Ray 34 and vanishing spot 37 may be employed to determine right-angular relationship of integrated plane mirror 51 to incident beam 31. The mode-coupled beam 31 then extends along the dotted line 46 into the optical cavity.

According to the illustrated embodiment of the invention, a first temperature detector or thermistor 61 senses first temperature variations of the oven wall 21 spaced from the cavity 10 or spacer 13, while a second temperature detector or thermistor 62 senses second temperature variations of the spacer 13 or cavity 10 spaced from the oven wall. Within the scope of this aspect of the invention, different means may be employed for sensing these first and second temperature variations.

The electric signals corresponding to the first temperature variations of the oven wall 21 are applied to a first preamplifier 64, while the electric signals corresponding to the second temperature variations of the cavity 10 or spacer 13 are applied to a second preamplifier 65. The preamplified first signals are applied to a further amplifier 66. On the other hand, the preamplified second signals are applied to an integrating amplifier 67. The amplifiers 66 and 67 may be operational amplifiers; the difference being that the second amplifier 67 has an integrating network in its feedback path, which makes the output of the second amplifier 67 respond slower to temperature variation signals, than the output of the first amplifier 66.

The outputs of the amplifiers 66 and 67 are applied to a summing network 68 which, in turn, applies the combined outputs as a control signal to the control signal input of the electric heater energizing power source 69. In consequence, the illustrated preferred embodiment of the invention controls energization of the heater 71 more rapidly in response to the first temperature variations of the outer oven wall, than in response to the second temperature variations of the inner optical cavity wall.

In practice, this has turned out to yield very significant improvements in the operation of the optical cavity. It has particularly been found that controlling energization of the heating means more rapidly in response to the first temperature variations, than in response to the second temperature variations, in practice protects performance of the function of the optical cavity 10 on light from the incident beam 31 against outside temperature variations.

For instance, with the system of the subject invention, the heater energization can rapidly respond to effects of outside temperature variations, before any such adverse effect has had time to affect the performance of the internal optical cavity 10. On the other hand, the heater energization control will eventually respond to persistent temperature changes which exceed the time constant of the integrating amplifier 67.

A PZT structure or contractible and expansible feature of the spacer 13 permit tuning of the optical cavity 10 to a desired resonant frequency. A piezo-electric or other scanner system 73 may be employed to scan the cavity for resonance frequencies within a given band.

Many applications of optical cavities according to the subject invention are well known, and include optical spectrum analysis, narrow band optical filtering, laser external cavity stabilization, analysis of mode structure, particularly for injection diode, ion and dye lasers.

Optical cavities made and operated according to the subject invention perform many times better at one inch length than conventional cavities ten and more times longer. The subject invention permits outstanding results with very short cavities, and production models having a cavity length of 20 micron have shown both a large free spectral range and sub-Doppler resolution.

Within the scope of the subject invention, the photodetector assembly 48 may be removed from the end plate 75 of the overall optical cavity housing 25. If desired, an output aperture similar to the input aperture 35 may then be provided in the end plate 75. With the photodetector assembly 48 thus removed or replaced by a second aperture (not shown), the optical cavity structure may be used as a narrow-band filter. Excellent filtering characteristics may then be achieved by employing the mode coupling feature or the heater control feature herein disclosed or by preferably utilizing a combination of these features for best results.

This extensive disclosure renders apparent or suggests various modifications and variations within the spirit and scope of the subject invention to those skilled in the art.

I claim:

1. A method of mode coupling a light beam into an optical cavity having a cavity axis, comprising in combination the steps of:
   positioning a mirror at right angles to, but laterally of, said cavity axis;
   providing a rigid interconnection of said mirror and cavity;
   effecting a reflection of light of said beam with said mirror along a geometric ray originating at said mirror;
   adjusting said rigidly interconnected mirror until the latter ray coincides with said beam; and
   retaining said geometric ray in place while moving said mirror and optical cavity so that said cavity axis moves translatorily relative to said retained geometric ray, until said cavity axis coincides with said retained geometric ray and thereby with said light beam.

2. A method as claimed in claim 1, including the step of:
   integrating said mirror in a housing including said optical cavity.

3. A method of mode coupling a light beam into an optical cavity having a cavity axis, comprising in combination the steps of:
   positioning a plane mirror at right angles to, but laterally of, said cavity axis;
   providing a rigid interconnection of said plane mirror and cavity;
   effecting reflection of light of said beam with said plane mirror;
   adjusting said rigidly interconnected plane mirror until said plane mirror extends at right angles to said beam; and
   moving said optical cavity translatorily, while retaining said rigid interconnection and while moving said plane mirror in a plane extending at said right angles, until said cavity axis coincides with said light beam.

4. A method as claimed in claim 3, including the step of:
   integrating said plane mirror in a housing including said optical cavity.

5. In a method of operating an optical cavity, the improvement comprising in combination the steps of:
   providing an oven for said cavity having an oven wall;
   installing said optical cavity inside of said oven, with said oven wall being spaced from said cavity;
   heating said inside of the oven and said optical cavity with said oven;
   coupling a light beam into said cavity and performing a function on light from said beam with said heated optical cavity;
   sensing first temperature variations of said oven wall spaced from said cavity;
   sensing second temperature variations of said cavity at a location spaced from said oven wall; and
   protecting performance of said function on light from said beam against outside temperature variations by controlling energization of means heating said oven more rapidly in response to said first temperature variations than in response to said second temperature variations.

6. A method as claimed in claim 5, including the steps of:
   positioning a mirror at right angles to, but laterally of, said cavity axis;
   providing a rigid interconnection of said mirror and cavity;
   effecting a reflection of light of said beam with said mirror along a geometric ray then originating at said mirror;
   adjusting said rigidly interconnected mirror until the latter ray coincides with said beam; and
   retaining said geometric ray in place while moving said mirror and optical cavity so that said cavity axis moves translatorily relative to said retained geometric ray, until said cavity axis coincides with said retained geometric ray and thereby with said light beam.

7. A method as claimed in claim 6, including the step of:
   integrating said mirror in a housing including said optical cavity.

8. A method as claimed in claim 5, including the steps of:
   positioning a plane mirror at right angles to, but laterally of, a cavity axis of said optical cavity;
   providing a rigid interconnection of said plane mirror and cavity;
   effecting reflection of light of said light beam with said plane mirror;
   adjusting said rigidly interconnected plane mirror until said plane mirror extends at right angles to said beam; and
   mode coupling said light beam into said optical cavity by moving said optical cavity translatorily, while retaining said rigid interconnection and while moving said plane mirror in a plane extending at said right angles, until said cavity axis coincides with said light beam.

9. A method as claimed in claim 8, including the step of:
   integrating said plane mirror in a housing including said optical cavity.

10. In combination, an optical cavity having a cavity axis; and means for mode coupling a light beam into said optical cavity, including:
    means for effecting reflection of light of said beam along a geometric ray originating laterally of said cavity axis, including a mirror positioned at right angles to, but laterally of, said cavity axis, and a rigid interconnection of said mirror and cavity;
    means for repositioning said rigidly interconnected mirror until said geometric ray, originating at said mirror, coincides with said beam; and
    means for retaining said geometric ray in place and for moving said mirror and optical cavity so that said cavity axis moves translatorily relative to said retained geometric ray, until said cavity axis coincides with said retained geometric ray and thereby with said light beam.

11. A combination as claimed in claim 10, wherein:
    said mirror is integrated in a housing including said optical cavity.

12. In combination, an optical cavity having a cavity axis; and means for mode coupling a light beam into said optical cavity, including:
    means for effecting reflection of light of said beam, including a plane mirror positioned at right angles to, but laterally of, said cavity axis;
    a rigid interconnection of said plane mirror and cavity;
    means for adjusting said rigidly interconnected plane mirror until said plane mirror extends at right angles to said beam; and
    means for moving said optical cavity translatorily, while retaining said rigid interconnection and while moving said plane mirror in a plane extending at said right angles, until said cavity axis coincides with said light beam.

13. A combination as claimed in claim 12, wherein:
    said plane mirror is integrated in a housing including said optical cavity.

14. In combination,
    an optical cavity;
    an oven for said cavity having an oven wall;
    means for installing said optical cavity inside of said oven so that said oven wall is spaced from said cavity;
    means for heating said inside of the oven and said optical cavity with said oven;
    means for sensing first temperature variations of said oven wall spaced from said cavity;

means for sensing second temperature variations of said cavity at a location spaced from said oven wall; and means connected to said means for sensing first temperature variations and to said means for sensing second temperature variations, and connected also to the heating means for controlling energization of said heating means more rapidly in response to said first temperature variations than in response to said second temperature variations.

15. A combination as claimed in claim 14, including:

means for mode coupling a light beam into said optical cavity installed in said oven, comprising:

means for effecting reflection of light of said beam along a geometric ray originating laterally of a cavity axis of said optical cavity, including a mirror positioned at right angles to, but laterally of, said cavity axis, a rigid interconnection of said mirror and cavity;

means for repositioning said rigidly interconnected mirror until said geometric ray, originating at said mirror, coincides with said beam; and means for retaining said geometric ray in space and means for moving said mirror and optical cavity so that said cavity axis moves translatorily relative to said retained geometric ray, until said cavity axis coincides with said retained geometric ray and thereby with said light beam.

16. A combination as claimed in claim 15, wherein:

said mirror is integrated in a housing including said optical cavity.

17. A combination as claimed in claim 14, including:

means for mode coupling a light beam into said optical cavity installed in said oven, comprising:

means for effecting reflection of light of said beam, including a plane mirror positioned at right angles to, but laterally of, a cavity axis of said optical cavity;

a rigid interconnection of said plane mirror and cavity;

means for adjusting said rigidly interconnected plane mirror until said plane mirror extends at right angles to said beam; and means for moving said optical cavity translatorily, while retaining said rigid interconnection and while moving said plane mirror in a plane extending at said right angles, until said cavity axis coincides with said light beam.

18. A combination as claimed in claim 17, wherein:

said plane mirror is integrated in a housing including said optical cavity.

* * * * *